July 1, 1930. A. R. BLEWETT 1,769,014
POWER LEVELING MEANS FOR HILLSIDE HARVESTER THRASHERS
Filed Oct. 3, 1927 6 Sheets-Sheet 2

Inventor.
Arthur R. Blewett.
By H.P. Doolittle
Atty.

July 1, 1930.　　　A. R. BLEWETT　　　1,769,014
POWER LEVELING MEANS FOR HILLSIDE HARVESTER THRASHERS
Filed Oct. 3, 1927　　6 Sheets-Sheet 4

Inventor.
Arthur R. Blewett
By
Atty.

July 1, 1930.  A. R. BLEWETT  1,769,014
POWER LEVELING MEANS FOR HILLSIDE HARVESTER THRASHERS
Filed Oct. 3, 1927  6 Sheets-Sheet 5

Inventor.
Arthur R. Blewett.
By
Atty.

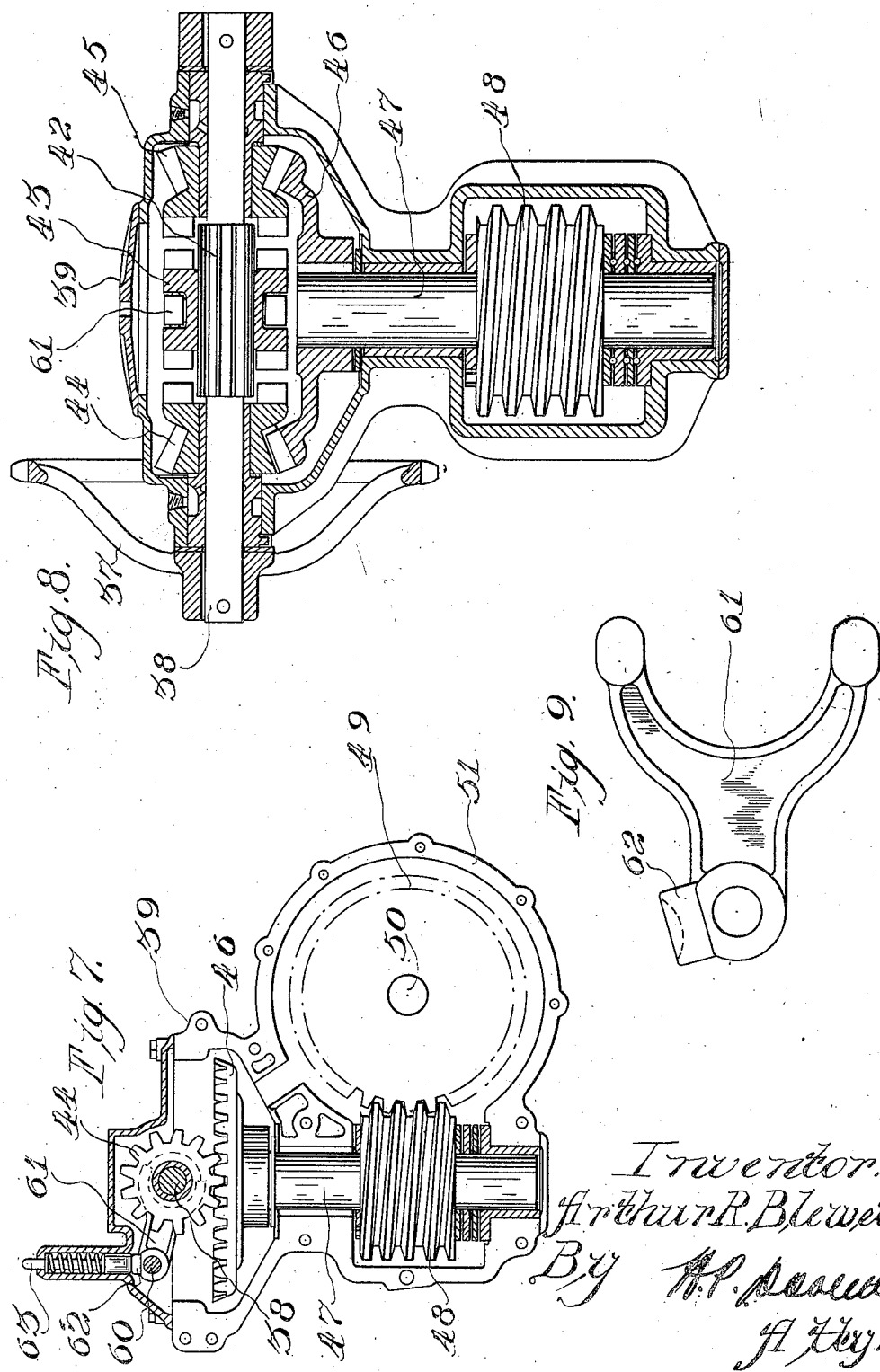

Patented July 1, 1930

1,769,014

UNITED STATES PATENT OFFICE

ARTHUR R. BLEWETT, OF CHICAGO, ILLINOIS, ASSIGNOR TO INTERNATIONAL HARVESTER COMPANY, A CORPORATION OF NEW JERSEY

POWER LEVELING MEANS FOR HILLSIDE HARVESTER THRASHERS

Application filed October 3, 1927. Serial No. 223,494.

This invention relates to harvester thrashers of the type designed for use on hillsides for which a leveling means must be provided for maintaining the thrasher part at all times level even when operating on hillsides.

The objects of the invention are to provide an improved power operated leveling device for hillside harvester thrashers; to provide an improved, automatically controlled, trip mechanism throwing the driving gearing into neutral position when the thrasher part has been leveled to a predetermined high or low position; to provide a novel hand control means for actuating the clutch to initiate operation of the driving mechanism and simultaneously, by the same means, to set the trip in the path of movement of the controlling means which throws the gear into neutral to stop the raising or lowering movement; to provide a novel form of rack structure guided in a guide structure, which will prevent buckling of the rack; and, lastly, generally to improve devices of this kind for enhancing the operation of hillside harvester thrashers.

These desirable objects are achieved, briefly, in a machine of this kind comprising a main frame carrying a thrasher part and a floating harvester part. The main frame is carried on a main wheel and on a grain wheel, said grain wheel carrying a supplementary frame including a rack, which supplementary frame is pivotally connected to the main frame whereby the rack may be power actuated to raise or lower the main frame and with it the thrasher part, to level the same relatively to said main wheel. The supplementary rack frame is suitably trussed and includes stops contactable with a trip mechanism for throwing the driving gearing to neutral position to stop the rack at a predetermined point in either its up or down position. A hand control means is provided for setting the clutch to initiate the drive, said control means including means for setting the automatically controlled stopping trip, all as will later more fully appear.

Looking to the drawings, in which an illustrative embodiment of the invention has been shown, it will be seen that:

Figure 7 is a detail end view of the gearing in said casing;

Figure 8 is a side elevational view, partly in section, of the same gearing;

Figure 9 is a detail view of the clutch shipper fork;

Figure 10 is a plan view of the automatically controlled trip for the clutch mechanism;

Figure 11 is a side view of the same trip, showing the position thereof when the rack is moving down; and Figure 12 is a similar view showing the position of the trip when the rack is moving up.

Figure 4:
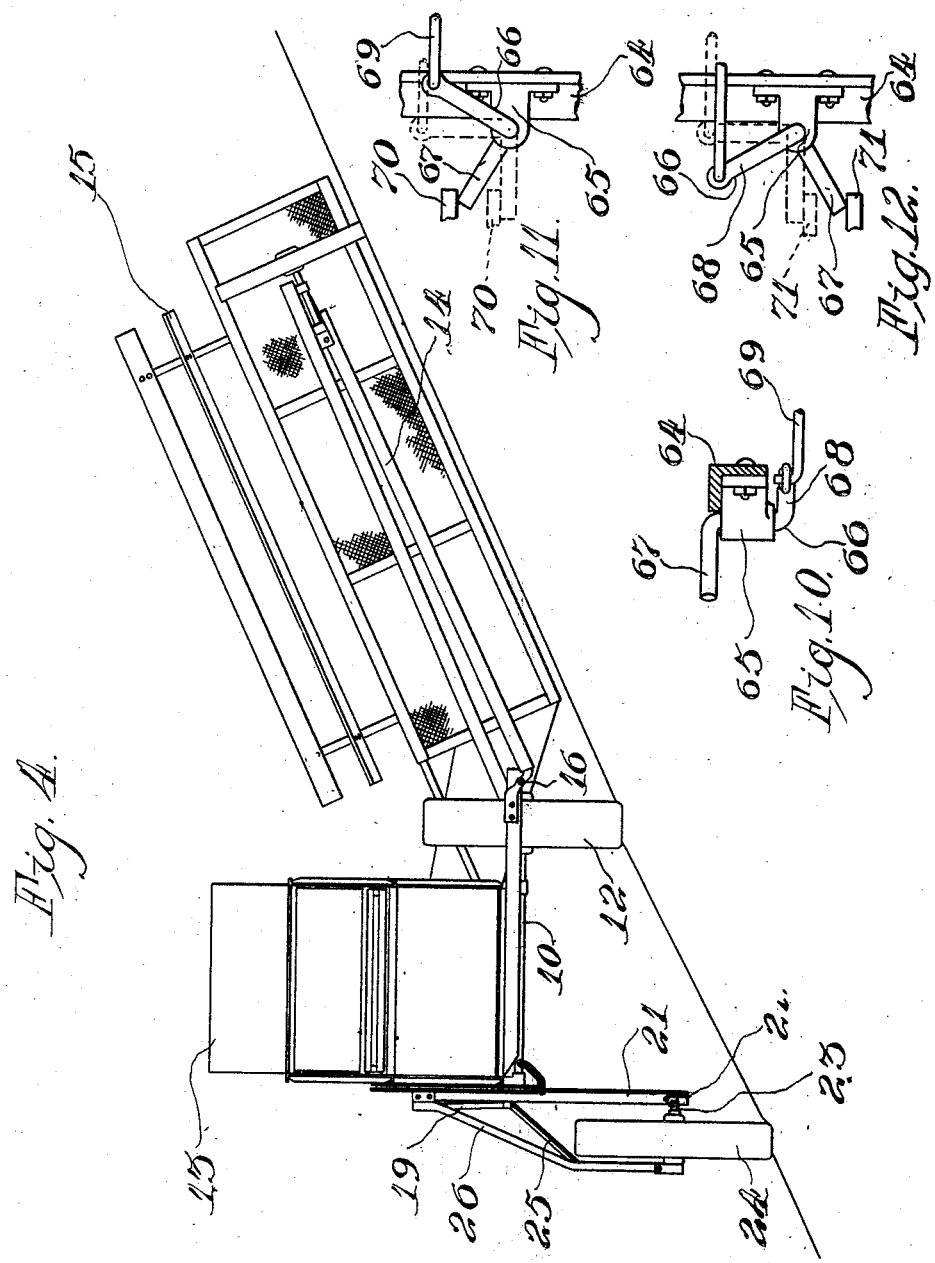
Figure 4 is a general rear elevational view, showing the thrasher part elevated to a high position, as when operating the harvester thrasher on a hillside.

The harvester thrasher herein illustrated embodies a main axle 10 carrying a main frame 11, said axle being carried at one end in a grain wheel 12. The frame 11 rigidly carries the usual thrasher part 13. Pivotally connected to the main frame in any approved manner, as best shown in Figure 4, is the grainwardly extending harvester support 14 to which is connected the usual harvester part 15, which, due to a pivotal connection 16, is permitted to float up and down in accordance with the slope of a hillside, as is usual in this art.

Figure 5:
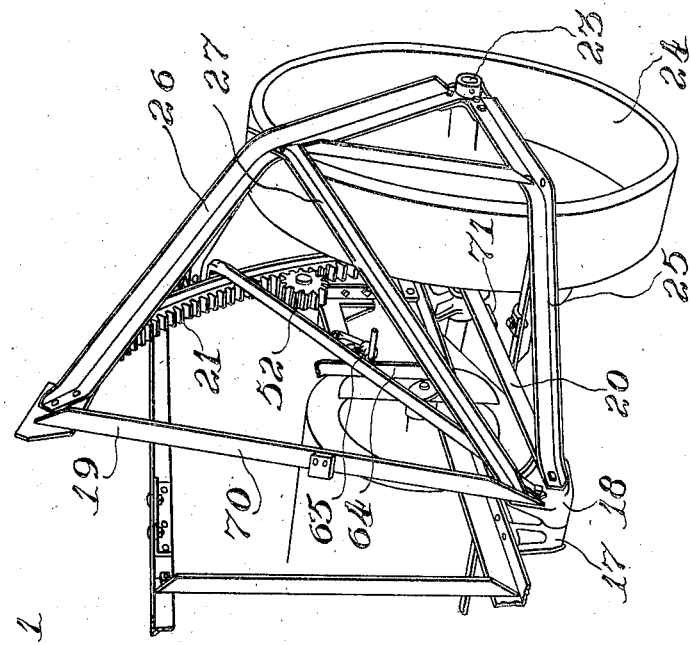
Figure 5 is a perspective view of the power leveling mechanism.

At a point substantially forwardly of the axle 10, the main frame 11 carries a bracket 17 to which is pivotally connected a bracket 18, as shown in Figure 5, which bracket carries side members 19 and 20, which are angularly spaced apart, as shown, and are connected by an arcuate rack 21 to form what may be termed a supplementary frame. The rear end of the bar 20 includes a bracket 22 (see Figure 2), which carries a stub axle 23 carried in a main wheel 24. The supplementary frame is suitably trussed by a lateral brace 25 from the bracket 18 around the main wheel 24, as best shown in Figure 5, and by a brace 26 extending upwardly and over the wheel to the top of the supplementary frame. A middle truss member 27 is also provided to impart further strength to the supplementary frame.

It can now be seen that the entire main frame 11 and thrasher part 13 is adapted for up and down movement relatively to the main wheel 24, to permit leveling of the thrasher part when operating the harvester thrasher on a hillside. Such means will now be described.

Figure 3:
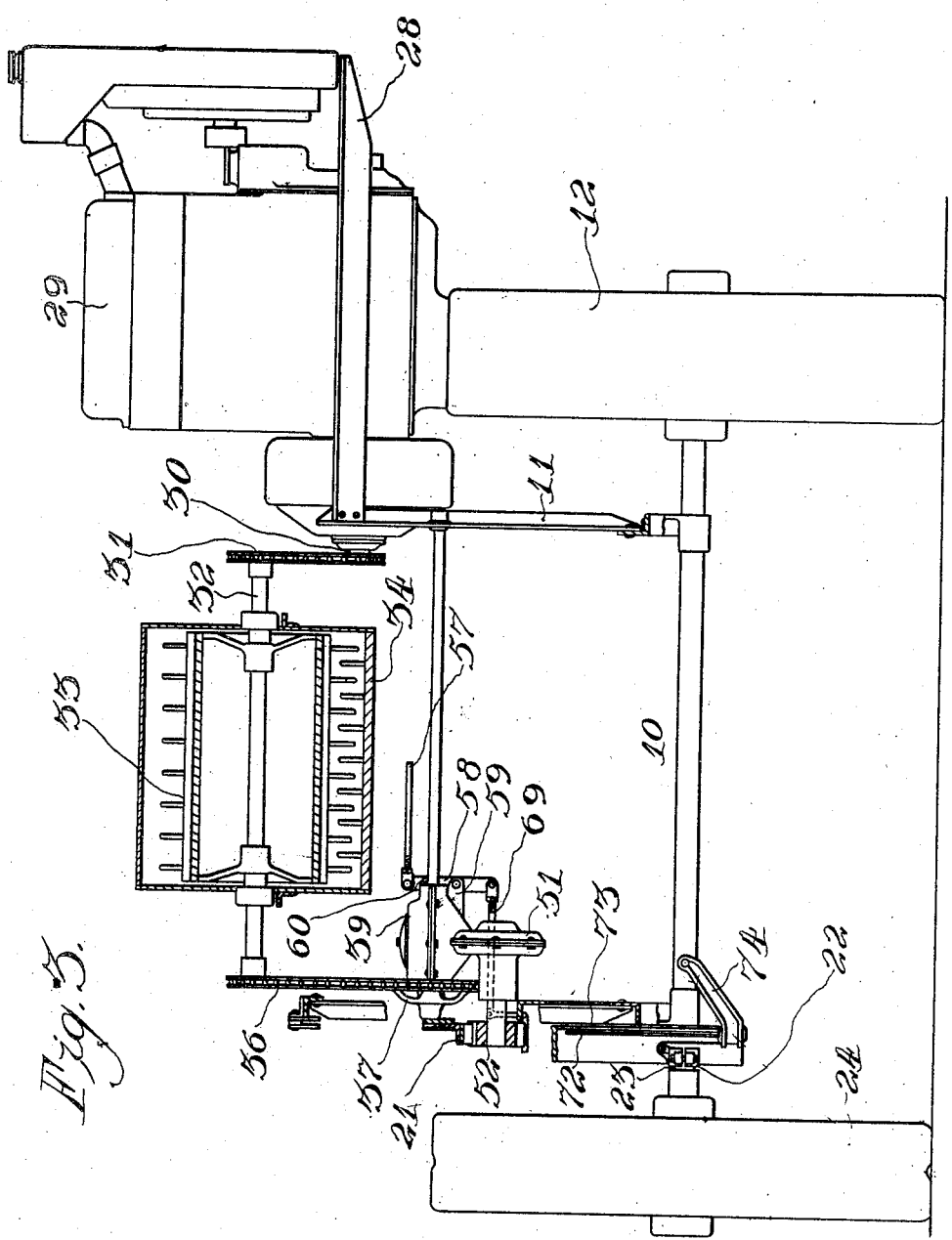
Figure 3 is a schematic elevational view as seen from the rear, showing the driving connections.
Figure 6:
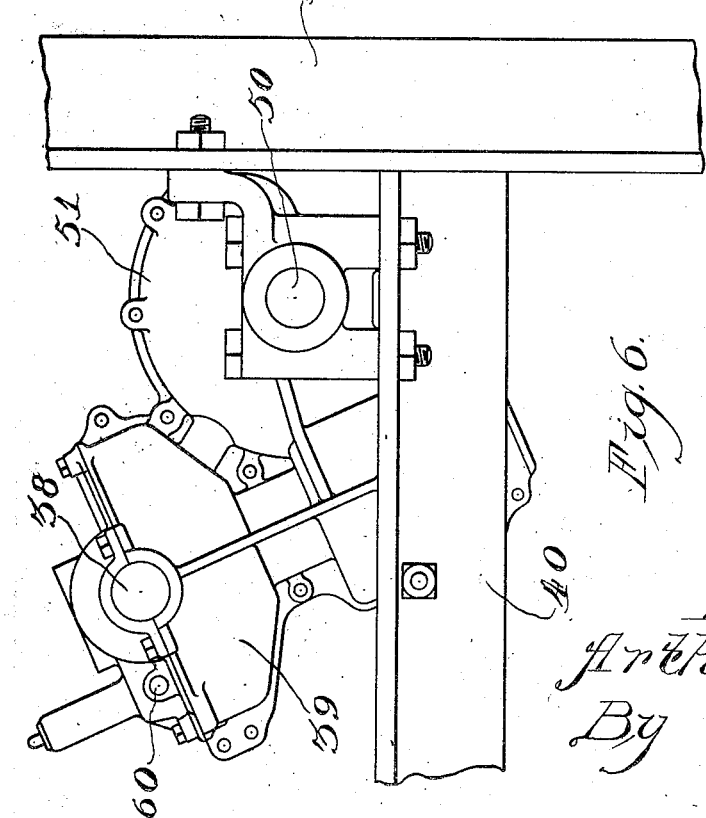
Figure 6 is a detail view in side elevation, showing the mounting of the driving gearing case on the frame.

The main frame 11 supports on a suitable elevated frame structure 28, an engine 29, the crank shaft 30 of which is connected by a sprocket chain 31 to a cylinder shaft 32 journaled in the thrasher part. As shown in Figure 3, this shaft 32 carries the usual thrashing cylinder 33, and a concave 34 is also indicated to represent the cooperative thrashing structure. The shaft 32 runs transversely and comes out at the stubbleward side of the machine where it carries a sprocket wheel 35 connected by a chain 36 to a sprocket wheel 37, (see also Figure 8), fast on a transverse shaft 38. This shaft 38 is journaled in a gear box 39 bolted to a horizontal frame piece 40 carried on an upright 41 forming part of the main frame 11, (see Figure 6).

As shown in Figure 8, the shaft 38 includes a middle splined part 42 on which is slidably mounted a clutch part 43. The shaft 38 also carries on either side of the clutch 43 and spaced therefrom, a bevel gear 44 and a bevel gear 45, said gears 44 and 45 being loose on the shaft and including any conventional form of complementary clutch parts adapted to be in mesh with the clutch member 43 for driving either the gear 44 or the gear 45. The gears 44 and 45 are both in constant mesh with a large bevel pinion 46 fast on a shaft 47, which shaft 47 also carries a worm gear 48 in mesh with a worm pinion 49 fast on a shaft 50 journaled in a housing part 51. The shaft 50, as shown in Figure 3, protrudes laterally in a stubbleward direction where it carries a spur gear 52 in mesh with the arcuate rack 21.

It can now be seen that the engine drives the cylinder 33, and power is taken from the cylinder shaft 32, through clutch controlled reversing gearing, for driving the gear 52 to move the rack 21 up or down, and as the rack, through the members 19 and 20, carries the main wheel 24 and is pivotally connected to the main frame 11, necessarily the main frame 11 and thrasher part 13 are moved either up or down relative to the main wheel 24, as will be understood.

Figure 1:
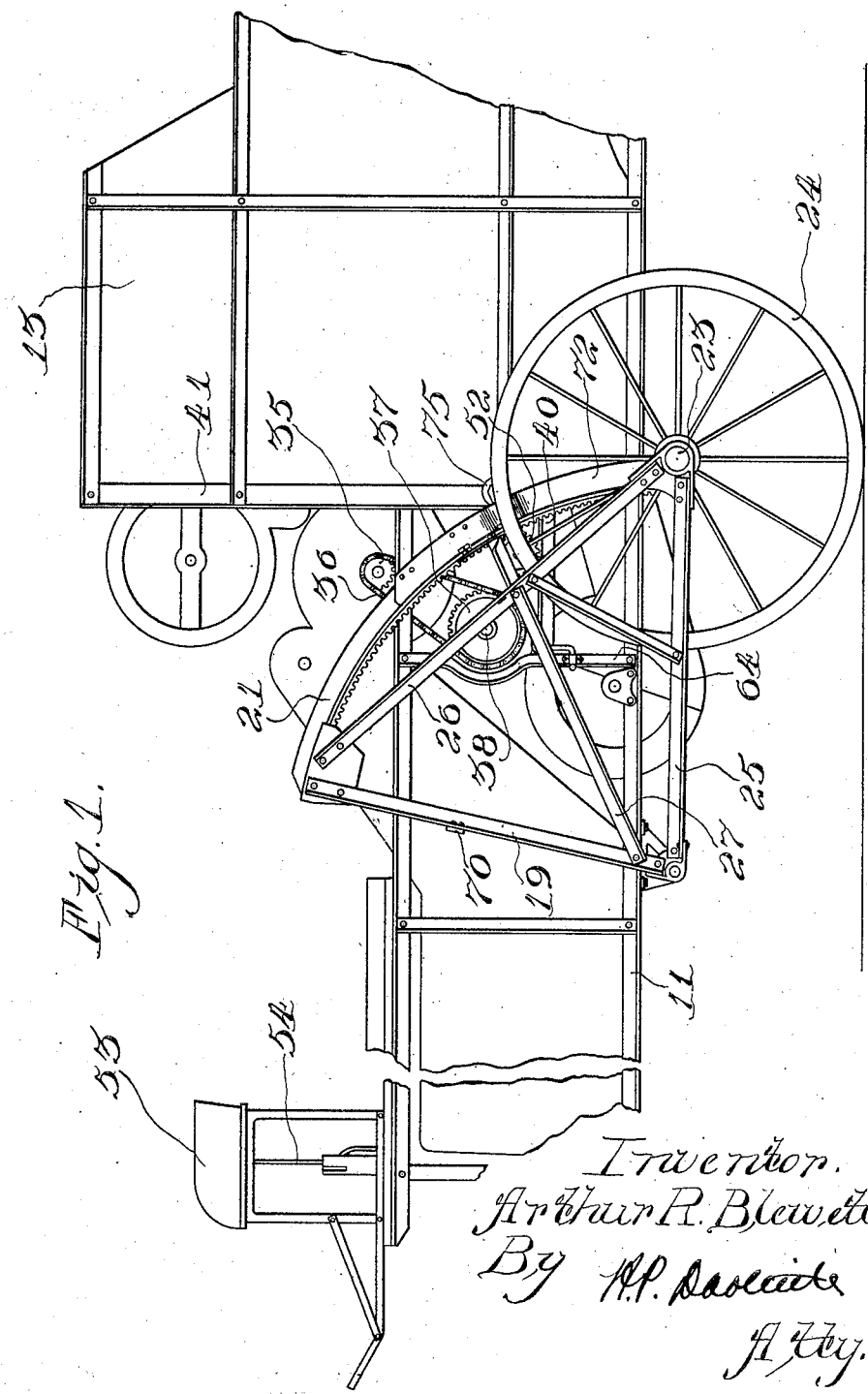
Figure 1 is a general side elevational view of a harvester thrasher showing the stubbleward side thereof.
Figure 2:
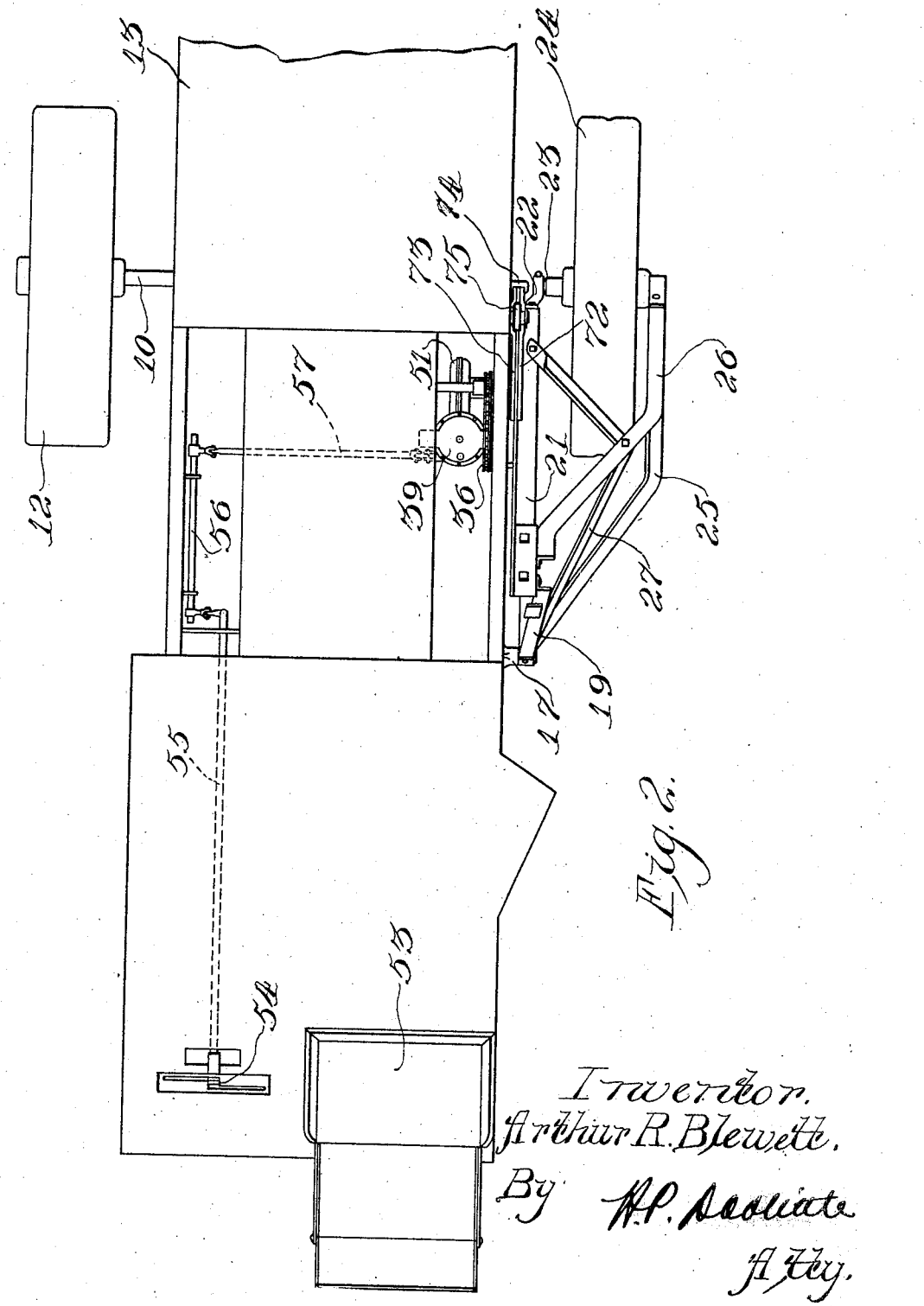
Figure 2 is a general plan view of the structure shown in Figure 1.

Adjacent a seat 53 on the thrasher part is a hand lever 54 connected to a rockshaft 55 for operating a second rockshaft 56 to push or pull on a link 57 which rocks a vertical bar 58 pivotally mounted on a bracket 59 formed on the gear case 39, as best shown in Figures 2 and 3. Above the connection of said bar 58 to the bracket 59, said bar carries a sliding key 60 on which is carried a shipper fork 61 engaged in a groove in the clutch part 43, whereby said clutch part 43 may be shipped on the spline 42 into driving engagement with either the gear 44 or the gear 45. A socketed boss 62 is included in the fork 61 adapted yieldingly to receive a locking spring-pressed plunger 63 of any conventional form for yieldingly locking the shipper fork 61 in adjusted position, as will be understood.

Let us assume that the gear 52 is rotating in a direction to move the rack 21 upwardly. As the gearing for accomplishing this result is motor driven and as the operator cannot very well watch the movement of the rack 21, a safety means must be provided for stopping the drive for this rack when the rack reaches a predetermined high point of movement. It is desirable that such means be automatic and function independently of the operator. Such means has been provided and will now be described.

An upright 64 on the main frame carries a bracket 65 in which is journaled a bell crank 66 having oppositely extending crank portions 67 and 68, the latter portion 68 being connected by a link 69 to the lower end of the rocker bar 58. Thus, it will be seen that the operator, when actuating the lever 54 to set the clutch 43 into driving engagement with one of the gears 44 or 45, also sets, through this single control member, the trip crank part 67 into the path of movement of either the supplementary frame bar 19 or 20, so that either a block 70 on the member 19, or a block 71 on the member 20, is in a position to strike said crank portion 67, whereupon the bar 58 will be rocked through the connection 69 to throw the clutch part 43 out of driving engagement into its neutral position, as shown in Figure 8, thus stopping the drive independently of the operator and avoiding damage to the machine.

As the supplementary frame described is subjected to heavy loads in the leveling operation, it is desirable that a guiding means be provided for the rack bar 21, to hold it in a true line of movement and also to prevent the same from buckling. This rack bar 21 is preferably an angle iron, and one flange thereof is movable between two plates 72 and 73 carried by a bracket 74 bolted to the axle 10. It can, therefore, be seen that the angle flange of the rack bar 21 is pivotally guided in a channeled track rigidly carried on the main frame of the thrasher part. The operation of the improved leveling mechanism will now be summarized.

Let us assume that the machine is traveling on a hillside and it is desired to level the thrasher part because it is necessary to efficient separation that the internal thrasher parts operate in a horizontal plane. The operator, therefore, must raise the thrasher part. He does this by throwing the hand lever 54 to engage the clutch part 43 with the gear 45 to drive the gear 52 in the proper direction, to drive the rack 21 downwardly in its guideways 72 and 73. As the main wheel 24 is on the ground, the forward end of the rack where it is pivoted at 17 to the main frame 13 must push up on said main frame to raise the same and thereby level the thrasher part. (See Figure 4.) If the rack 21, that is its upper end, moves far enough with its bar 19 to cause the block 70 to engage the trip part 67, as shown in Figure 11, the crank 66 will, through the connection 69, throw the clutch part 43 out of engagement with the gear 45 and into its neutral position, whereupon the drive is automatically stopped. As the rack 21 is driven through worm gears 48 and 49, the supplementary frame will be locked in whatever position the parts happen to be when they come to rest, as this gearing is irreversible. It will be understood that the bar 19 with its block 70 merely comes far enough, as shown in Figure 11, to move the trip part 67 straight out to the dotted line position, the bar 19 and block 70 never passing the part 67.

Through the hand control lever 54 the trip 67 is always properly set when the clutch part 43 is engaged, as has been described. On the reverse movement, if it is desired to lower the thrasher part, the rack 21 will be driven upwardly through the gear 44 and, when the clutch part 43 is connected with said gear 44, the trip part 67 will automatically be set from the dotted line position to the full line position shown in Figure 12, where the lower frame bar 20 brings the block 71 into position to contact the part 67, as shown in Figure 12, again to limit the downward drive at a predetermined point.

Another feature of the invention is the provision of a roller 75 secured in any approved manner to the back side of the spur gear 52. That is, the roller operates on the back side of the rack bar and functions to maintain said gear 52 in tight engagement with said rack as will be understood.

From this detailed description, it should now be obvious that an improved lever mechanism for a hillside harvester thrasher has been provided, which accomplishes all of the desirable objects heretofore recited.

It is the intention to cover all such changes and modifications of the structure herein shown for the purpose of illustration as do not depart from the spirit and scope of the invention as indicated in the following claims.

What is claimed is:

1. In a harvester thrasher, a main frame carrying a thrasher, a main wheel and a grain wheel supporting the frame, a supplementary frame including an arcuate rack for mounting the main wheel independently of the main frame, power operated means for moving said rack and supplementary frame to raise or lower the thrasher relative to said main wheel, and automatic means for stopping the power means when the supplementary frame reaches a predetermined position up or down.

2. In a harvester thrasher, a main frame carrying a thrasher, a main wheel and a grain wheel supporting the frame, a supplementary triangular frame having two spaced bars and including an arcuate rack, said supplementary frame mounting the main wheel independently of the main frame, power means for raising or lowering the rack and supplementary frame to level the thrasher relative to the main wheel, and means operative by the two spaced bars for stopping the power means to limit the raising and lowering movement.

3. In a harvester thrasher, a main frame carrying a thrasher, a main wheel and a grain wheel supporting the frame, an arcuate rack carried by the main wheel including a trussed frame pivotally connected to the main frame, driving means for operating the rack to raise or lower the main frame relative to the main wheel for leveling the thrasher, and a trip for throwing the driving means to neutral position, said trip being controlled by opposite bars forming a part of said trussed frame.

4. In a harvester thrasher, a main frame carrying a thrasher, a main wheel and a grain wheel supporting the frame, a rack carried by the main wheel including a trussed frame pivotally connected to the main frame, gearing for driving the rack up or down to raise or lower the main frame relative to said wheel to level the thrasher, a clutch for throwing the gearing to neutral position, means for operating the clutch, and stops included in the trussed frame for contacting the clutch operating means to throw out the clutch automatically when the thrasher reaches a predetermined maximum up or down position.

5. In a harvester thrasher, a main frame carrying a thrasher, a main wheel and a grain wheel supporting the frame, a rack carried by the main wheel including a trussed frame pivotally connected to the main frame, gearing for driving the rack up or down to raise or lower the main frame relative to said wheel to level the thrasher, a manually controlled clutch for actuating the gearing, a trip, and means included in the trussed frame for actuating the trip when the thrasher reaches a predetermined up or down position to throw the clutch to neutral position for stopping the drive.

6. In a harvester thrasher, a main frame carrying a thrasher, said frame being supported on a main wheel and a grain wheel, a supplementary frame including an arcuate rack pivotally connecting the main frame to the main wheel, gearing for driving the rack to raise or lower the main frame relative to the main wheel for leveling the thrasher, a clutch for connecting and disconnecting the gearing to drive or stop the rack, a trip automatically controlled by stops included in the supplementary frame for controlling the clutch, and single means for setting the clutch to initiate the drive and at the same time setting the trip in the path of one or the other of said stops.

7. In a harvester thrasher, a main frame carrying a thrasher, said frame being supported on a main wheel and a grain wheel, a supplementary frame including an arcuate rack pivotally connecting the main frame to the main wheel, gearing for driving the rack to raise or lower the main frame relative to the main wheel for leveling the thrasher, and arcuate guide means on the main frame for said rack.

8. In a harvester thrasher, a main frame carrying a thrasher, said frame being supported on a main wheel and a grain wheel, a supplementary frame including an arcuate rack comprising an angle bar including braces pivotally connecting the main frame to the main wheel, gearing for driving the rack to raise or lower the main frame relative to the main wheel for leveling the thrasher, and means on the main frame providing a channeled track for the arcuate rack and serving as a guide therefor and also preventing buckling of the rack.

9. In a harvester thrasher, a main frame carrying a thrasher, said frame being supported on a main wheel and a grain wheel, a supplementary frame including an arcuate rack pivotally connecting the main frame to the main wheel, gearing for driving the rack to raise or lower the main frame relative to the main wheel for leveling the thrasher, and means connected to said gearing and operable therewith on the rack for maintaining the gearing in engagement with said rack.

In testimony whereof I affix my signature.

ARTHUR R. BLEWETT.